United States Patent
Richards et al.

(10) Patent No.: US 6,874,374 B2
(45) Date of Patent: Apr. 5, 2005

(54) FLOWMETER APPARATUS

(75) Inventors: Andrew Richards, Banchory (GB); Brett Lestrange, Rutherway (GB)

(73) Assignee: Expro North Sea Limited, Aberdeen (GB)

( * ) Notice: Subject to any disclaimer, the term of this patent is extended or adjusted under 35 U.S.C. 154(b) by 0 days.

(21) Appl. No.: 10/610,395

(22) Filed: Jun. 30, 2003

(65) Prior Publication Data

US 2004/0031330 A1 Feb. 19, 2004

Related U.S. Application Data

(63) Continuation of application No. 09/889,261, filed as application No. PCT/GB00/00069 on Jan. 13, 2000, now abandoned.

(30) Foreign Application Priority Data

Jan. 13, 1999 (GB) .............................................. 9900569

(51) Int. Cl.[7] .................................................. G01F 1/40
(52) U.S. Cl. .................................................. 73/861.53
(58) Field of Search ........................ 73/861.52, 861.53, 73/861.63, 861.42, 204.21, 195, 204.22

(56) References Cited

U.S. PATENT DOCUMENTS

| | | | |
|---|---|---|---|
| 1,126,275 A | 1/1915 | Rice ......................... | 73/861.52 |
| 1,143,631 A | 6/1915 | Keller et al. ............. | 73/861.52 |
| 2,240,119 A | 4/1941 | Montgomery et al. ... | 73/861.52 |
| 3,952,577 A * | 4/1976 | Hayes et al. ................ | 73/54.04 |
| 4,644,800 A * | 2/1987 | Kozlak ..................... | 73/861.64 |
| 5,365,795 A * | 11/1994 | Brower, Jr. .............. | 73/861.65 |
| 5,445,035 A * | 8/1995 | Delajoud ................. | 73/861.52 |
| 5,661,232 A | 8/1997 | VanCleve et al. .......... | 73/54.54 |
| 5,861,546 A | 1/1999 | Sagi et al. ............... | 73/861.55 |
| 6,058,787 A * | 5/2000 | Hughes .................... | 73/861.63 |
| 6,314,821 B1 | 11/2001 | Allan ...................... | 73/861.52 |

FOREIGN PATENT DOCUMENTS

| | | |
|---|---|---|
| EP | 454560 A1 | 10/1991 |
| EP | 749004 A | 12/1996 |
| GB | 2186981 A1 | 8/1987 |
| GB | 2261519 A | 5/1993 |
| WO | 94/16295 | 7/1994 |
| WO | 97/25594 | 7/1997 |

* cited by examiner

*Primary Examiner*—Edward Lefkowitz
*Assistant Examiner*—T Miller
(74) *Attorney, Agent, or Firm*—Gifford, Krass, Groh, Sprinkle, Anderson & Citkowski, P.C.

(57) ABSTRACT

A flowmeter is described which has a retrievable housing conduit which is locatable within a conduit or pipe and which seals against the pipe so that fluid only flows through the housing conduit, and a flow restriction is created within the housing conduit to create a Venturi when in use. At least two spaced pressure measuring stations are provided along the housing conduit, one of the stations located at an unrestricted flow location, the other at a restricted flow location, whereby pressures measured at these stations can be used to calculate fluid flow rates. Embodiments of the invention are described.

11 Claims, 3 Drawing Sheets

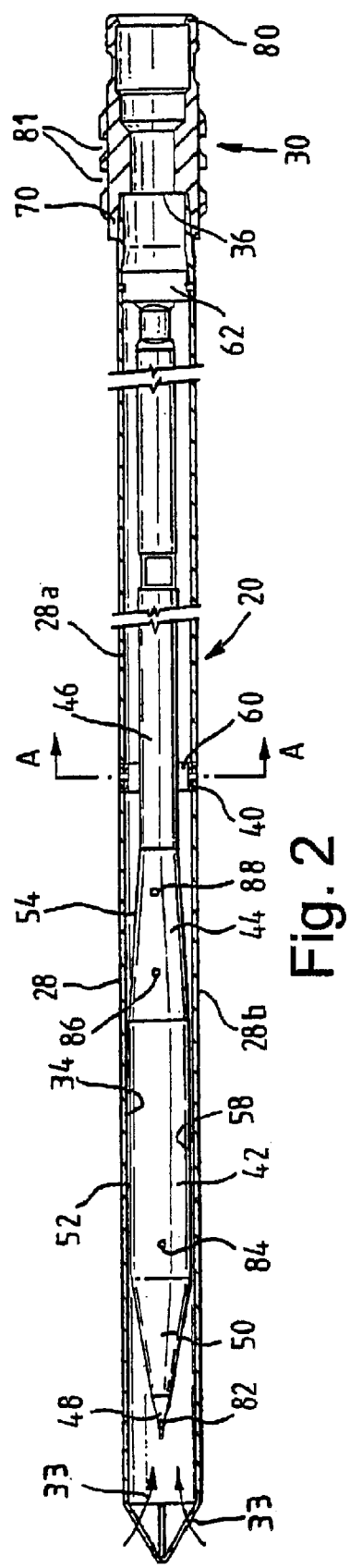
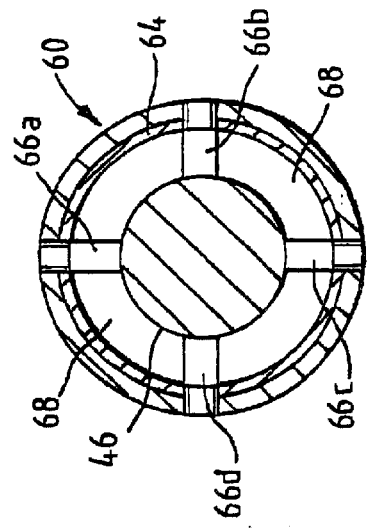

FLOWMETER APPARATUS

RELATED APPLICATIONS

This application is a continuation of U.S. patent application Ser. No. 09/889,261 filed Sep. 21, 2001 Abandoned, which is the U.S. national phase of PCT/GB00/00069 filed Jan. 13, 2000, which claims priority of United Kingdom Patent Application No. 9900569.6 filed Jan. 13, 1999.

FIELD OF THE INVENTION

The present invention relates to flow monitoring apparatus for, and to a method of, monitoring the flow of a fluid in a pipe.

BACKGROUND OF THE INVENTION

In particular, the present invention relates to a flowmeter for monitoring the flow of a liquid, gas, or multi-phase fluid through a conduit or pipe, particularly, but not exclusively, for use in downhole oilfield applications.

It is known to measure the flow rate of fluid flowing through a conduit or pipe in a downhole oilfield environment using flowmeters based on the Venturi principle which have throat restriction portions. A Venturi flowmeter is disclosed in U.K. Patent 2186981B in which a constant diameter section of pipe called a gradiomanometer merges smoothly with a converging section of pipe to act as a Venturi. Applicant's own U.K. Patent No. 2261519B discloses a hydrocarbon flow rate monitor which measures the flow of fluid through a production pipe by using a drill string during drill string testing (DST) of the production pipe. Measurements of pressure are taken from various points along the pipe from which fluid density and ultimately flow rate of hydrocarbons in the production pipe can be calculated. A modification of this flowmeter is disclosed in applicant's International Patent Publication No. WO 94/16295 where the Venturi flowmeter is provided with pressure measurement stations on either side of the flow restrictor to provide increased flexibility of use and accuracy of flow rate measurement.

Venturi flowmeters with throat restrictions including those mentioned above generally work well in practice but suffer from the main disadvantage of bore restriction which, in many cases, prevents tools being run through the flowmeter. These tools also require pressure sensors to be provided in the wall of the tubing where failure of a sensor can lead to abandonment of the flowmeter.

An alternative Venturi flowmeter is disclosed in the applicant's PCT Publication No. WO 97/25594, in which a flow restrictor insert is located centrally in the bore of a conduit or pipe, the flow restrictor insert being arranged so as to create an annular flow path around the insert. A remote pressure sensor downstream is used in conjunction with one of the pressure sensors at the Venturi, so as to be able to calculate fluid density ρ from the pressure difference as disclosed.

The flowmeter of WO 97/25594 suffers from the same disadvantage of bore restriction as the throat restrictor type. Wireline retrievable versions of both types can be used but these still require sensors in the tubing wall with the associated problems of sensor failure. One embodiment of the flowmeter in WO 97/25594 provides sensors in the insert. When the insert is retrievable this provides an advantage over other embodiments in the event of sensor failure.

However, the prior art flowmeters, including those disclosed in of WO 97/25594, suffer from the significant disadvantage that the accuracy of the calculated flow rates is highly dependent upon the spacing between the outer surface of the flow restrictor insert and the inner surface of the conduit or pipe in which the insert is located. This spacing is difficult to determine accurately in the downhole oilfield environment and, indeed, in other such similar applications where the insert is located in a conduit because the conduit is typically a well casing or production tubing, the surface of which tends to become coated over time by drilling materials, oil and the like adhering to the inner surface. This causes variation in tubing diameter which, in turn, causes variation in the accuracy of the pressure measurements and therefore upon the accuracy of the flow rate calculations.

Furthermore, when it is desired to measure the flow rates in conduits or pipes of different internal diameters, it is necessary to adjust the diameter of the flow restrictor insert to achieve the required spacing between the outer surface of the insert and the inner surface of the conduit or pipe. This is a time consuming process, typically requiring component parts of the insert to be changed, for example, by removing the leading portion of the insert which is shaped to create an annular flow path around the insert, and replacing this with a portion of different shape. The leading portion comprises an entry cone, a cylindrical body attached to the entry cone, and an exit cone at the trailing end of the body, attached to the remaining portion of the insert. Thus replacement of the leading portion is a complex and time-consuming procedure and is therefore expensive, requiring removal of the entry cone, the cylindrical body and the exit cone, followed by the installation of replacement parts of different outside diameter, depending on the diameter of the conduit or pipe receiving the insert.

It is amongst the objects of the present invention to obviate or mitigate at least one of the disadvantages of known inventions.

SUMMARY OF THE INVENTION

This is achieved, in the broadest sense, by locating a retrievable housing conduit within a conduit or pipe and which seals against the pipe so that fluid only flows through the housing conduit, and a flow restriction is created within the housing conduit to create a Venturi when in use. At least two spaced pressure measuring stations are provided along the housing conduit, one of the stations located at an unrestricted flow location, the other at a restricted flow location, whereby pressures measured at these stations can be used to calculate fluid flow rates as described above.

The housing conduit diameter is machined accurately as is the insert so that the spacing in the flow conduit is carefully controlled to provide flow rate calculations of much greater accuracy. The retrievability of the housing conduit is also an advantage.

According to a first aspect of the present invention, there is provided a flowmeter for measuring the flow rate of a fluid flowing through a conduit having an inside diameter, the flowmeter comprising:

a housing conduit for location within a portion of the conduit, the housing conduit having an inner surface and an outer surface, said housing conduit having an outside diameter less than the inside diameter of the portion of the conduit;

locating means for locating the housing conduit within the conduit to provide sealing engagement between the housing conduit and the conduit;

flow restriction means disposed within the housing conduit to create a flow restriction zone at a portion of the housing conduit to provide a restriction to fluid flow through said housing conduit, and pressure measurement means disposed in the housing conduit for measuring pressure of the fluid at least at two spaced pressure measurement locations along the length of the housing conduit to measure a pressure at an unrestricted flow location and at the flow restriction location, said housing conduit having predetermined internal diameters at the first and second pressure measuring locations.

Preferably, the flow restriction means is a generally cylindrical insert having a leading end on which fluid flowing through the housing conduit impinges, said leading end being coupled to a body of substantially constant diameter, the diameter of the leading end being less than the diameter of the body of the insert, an annular flow path being created around said insert, one of said pressure measurement locations being in said body at said substantially constant diameter to measure pressure at said flow restriction location.

Alternatively, the flow restriction means is an annular body having a leading end coupled to a generally cylindrical restriction portion having a circular cross-section orifice, wherein the diameter of the circular cross-section is less than the diameter of the leading end, and wherein the annular body lies adjacent to the inner surface of the housing conduit such that fluid flowing through the housing conduit flows through the circular cross-section.

Preferably, the annular body is formed integrally with the housing conduit.

Alternatively, the annular body is an insert adapted to be sealingly engaged within the housing conduit.

Advantageously, the locating means includes locking means and sealing means for locking and sealing the housing conduit to the flow conduit, such that when the flowmeter is located in the flow conduit, fluid can only flow through the housing conduit.

Preferably, the locking means and the sealing means are integral, such that the housing conduit is simultaneously engaged by the locking means and sealed to the conduit by the sealing means.

Alternatively, the locking means and the sealing means are separate, such that the housing conduit is separately engaged by the locking means and sealed to the conduit by the sealing means.

Preferably, flow restriction centralising means are provided for centralising the flow restriction means within the housing conduit.

Preferably, the pressure measurement means are differential pressure sensors. Alternatively, the pressure measurement means are absolute pressure sensors.

Preferably, one of the pressure measurement means is located at the leading edge of the flow restriction means for measuring the pressure at the unrestricted flow location, and the other pressure measurement means is located at a point along the length of the body of substantially constant diameter of the flow restriction means, for measuring the pressure at the restricted flow location.

According to a second aspect of the present invention, there is provided a method of measuring the flow rate of a fluid flowing through a flow conduit, comprising the steps of:

locating a housing conduit having an internal bore within the flow conduit;

sealing the housing conduit in the flow conduit to force fluid flowing through the flow conduit to flow through the internal bore of the housing conduit;

providing a restriction in the internal bore of the housing conduit for restricting the flow of fluid through the internal bore;

measuring the pressure of the fluid at least at a first unrestricted flow location and a second restricted flow location, and determining the fluid flow rate using measurements of fluid pressure taken at the first and second locations.

A flowmeter for measuring a range of flow rates in flow conduits having different diameters, said flowmeter comprising:

a) a housing conduit selectable from a range of housing conduits of different diameters;

b) sealing means coupled to said selected housing conduit for sealingly engaging the internal surface of said flow conduit;

c) a flow restrictor element releasably engageable with said housing conduit, said flow restrictor element being selectable from a range of flow restrictor elements of different diameters, the flow restrictor element having at least two spaced pressure measurement means for measuring pressure at an unrestricted flow location and a restricted flow location, said housing conduit and said flow restrictor being interchangeable with other housing conduits and flow restrictors from the respective ranges to allow the flowmeter to be assembled for use with a range of flow rates and flow conduit diameters.

Preferably the flow restrictor insert is a generally cylindrical annular element centrally disposed in the housing conduit for creating an annular flowpath. Alternatively, the flow restrictor insert is a tubular insert with a restriction throat of a reduced diameter.

BRIEF DESCRIPTION OF THE DRAWINGS

Embodiments of the present invention will now be described, by way of example, with reference to the accompanying drawings, in which:

FIG. 2 is a longitudinal sectional view of the flowmeter of FIG. 1 in more detail and shown to a larger scale;

FIG. 3 is an enlarged cross-sectional view of the flowmeter of FIG. 2 taken along lines A—A.

DETAILED DESCRIPTION OF THE PREFERRED EMBODIMENTS

Figure 1:
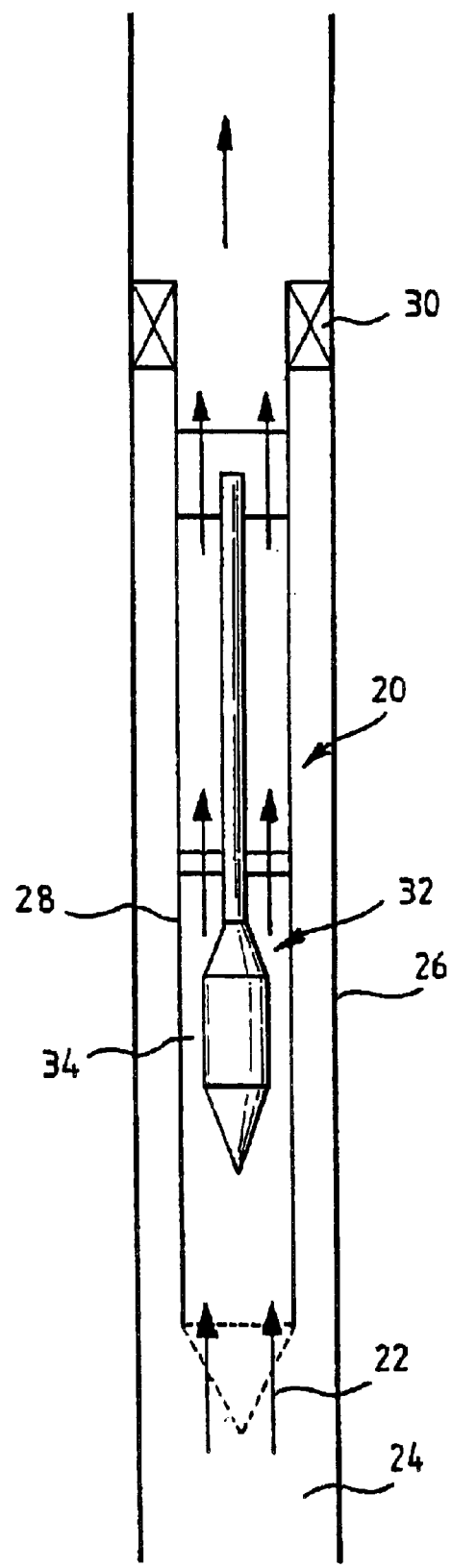
FIG. 1 is a diagrammatic sectional view of a wellbore incorporating a flowmeter in accordance with a preferred embodiment of the present invention.

Referring firstly to FIG. 1, there is shown a flowmeter indicated generally by reference numeral 20 for measuring the flow rate of a fluid 22 flowing through a wellbore 24 provided by well tubing 26. The flowmeter comprises a housing conduit 28, a locking seal 30 and flow restriction insert 32 centrally located in housing conduit so that fluid flows in an annulus 34 between the insert and housing conduit 28.

Referring now to FIG. 2 of the drawings, the housing conduit 28 is a cylindrical sleeve having an open upper end 36 and a lower generally conical perforated end 38 to facilitate location of the flowmeter 20 in the well tubing 26, and to permit fluid to flow through the conduit 28. The conduit 28 has a first cylindrical sleeve portion 28a and a second cylindrical sleeve portion 28b which are threaded together at location 40 to form the conduit 28. Furthermore, the second sleeve portion 28b can be unscrewed from its threaded engagement with the first sleeve portion 28a, and be replaced with an alternative second sleeve portion as will be later described.

The conduit 28 is located within the well tubing 26 by the locking seal 30 which, as will be described, locks the conduit 28 to a mating surface (not shown) in well tubing 26, and simultaneously seals the conduit 28 to the well tubing 26, so that fluid is prevented from flowing along the annulus 34 and flows through the conduit 28 past the insert 32, in the direction shown by the arrows 33 in FIG. 2.

The flow restriction insert 32 is in the general shape of a dart, i.e. having a pointed leading end in front of a wider body portion, the body portion tapering at its rear end towards an elongate cylindrical portion of smaller diameter which extends from the body. The insert comprises a sensor housing 42, an electronics housing 44 and a battery housing 46 arranged in series along the length of the conduit 28.

The sensor housing 42 has a tip 48 which forms part of a conical leading end 50 of the housing 42, a cylindrical body 52 of constant outside diameter, and a trailing end 54 which tapers in a direction from the body 52 towards the electronics housing 44. Thus an annulus 34 of constant width is formed between the outer surface of body 52 and the inner surface 58 of conduit 28.

The flow restriction insert 32 is centralised within the conduit 28 by spaced flowrings 60 and 62, as best seen in FIG. 2 and FIG. 3 whilst permitting fluid to flow through the conduit 28. In particular, flowring 60, shown at FIG. 3, includes a tubular collar 64 which is retained within conduit 28 at the location 40 between the first sleeve portion 28a and the second sleeve portion 28b. The flowring 60 includes four spring-loaded arms 66a–d, spaced at 90° around the circumference of the conduit 28. Arms 66a–d define quadrant gaps 68, through which fluid 22 flows.

Referring again to FIG. 2 locking seal 30 has a first threaded female opening 70 to receive a threaded end of the conduit 28 so that seal 30 and conduit 28 can be locked together. The locking seal 30 has a second female opening with a latching ring 80 for engaging wireline or coiled tubing (not shown) for lowering/raising the flowmeter within the well tubing 26. The locking seal 30 has latching protrusions 81 for engaging a suitable packer (not shown) in the well tubing 26 to both lock and seal the conduit 28 to the well tubing 26 in a known way.

Thus, as will be appreciated by persons skilled in the art, when the insert 32 is located in the conduit 28, and the conduit 28 is located in the well tubing 26, a Venturi is formed by the restriction in the cross-sectional flow area in flowmeter 20 from full bore width at the tip 48 of the sensor housing 42, to the annulus 34.

In use, well fluid flowing through the well tubing 26 flows through the conduit 28, impinging initially on the tip 48 of sensor housing 42, where the fluid flow is unrestricted. As fluid flows over the insert 32, the fluid flow becomes restricted, and the velocity of the fluid increases. In accordance with well known hydraulic flow principles, this increase in velocity causes a decrease in the pressure of the fluid from full bore pressure at the tip 48, to a reduced pressure in annulus 34.

A first pressure sensor 82 is disposed within the tip 48 to measure the full bore pressure and second pressure sensor 84 is disposed within the body 52 to measure the fluid pressure in annulus 34. Thus the pressure difference between the pressure of the fluid at unrestricted flow and the pressure at a restricted flow can be determined, either by measuring a differential pressure between the two points. This enables the fluid flow rate to be calculated using flow equations disclosed in WO 94/16295. It will be understood that there are simplified versions of general fluid mechanics equations which are well known in the art and which require to be modified to take account of actors such as pipe friction, temperature and hence thermal expansion, the particular dimensions of the pipes and Venturi, discharge coefficients and the like. The general fluid mechanics analysis can be found from the following references: (1) Kay J. M., An Introduction to Fluid Mechanics and Heat Transfer, 2nd Ed., Cambridge U Press, 1968; (2) ISO 5167 (BS 1042), Measurement of Fluid Flow in Closed Conduits, Part 1, BSI; (3) Miller R. W., Flow Measurement Engineering Handbook, 2nd Ed., McGraw Hill Pub., 1983; (4) Coulson J. M., Richardson J. F., Chemical Engineering, Vol 1, 2nd Ed., 1970; (5) Gregory, G. A., Fogarasi M., Alternate to Standard Friction Factor Equation, Oil & Gas J. Apr. 1, 1985, pp 120–127, and (6) Jorissen A. L., Discharge Measurements by Means of Venturi Tubes, Trans ASME, May 1951, pp 403–408.

Pressure measurements are made at pre-programmed time intervals and the data obtained is recorded in memory electronics provided in the electronics housing 44 of the flow restriction insert 32. Data stored in the memory electronics can be retrieved by removing the flowmeter 20 to the surface and interfacing the flowmeter with a computer (not shown), for the transferral of stored data to the computer for calculation of the fluid flow rates, or the flowmeter 20 may be connected to the surface via a wireline connection (not shown) for downloading stored data. In a further alternative arrangement, suitable electronics (not shown) may be provided within the flowmeter 20 to enable the flowmeter to perform the necessary calculations to determine the flow rates.

Power for the operation of the electronic equipment in the electronics housing 44 and for other operations of the flowmeter 20 is provided by an internal battery located in the battery housing 46 of flowmeter 20. Additional pressure sensors may be provided, such as the sensors 86 and 88, disposed within the trailing end 54 of the sensor housing 42. It will be understood by persons skilled in the art that the flow rate of fluid flowing through conduit 28 may be calculated by measuring the pressure of the fluid at least at two spaced locations within the conduit 28, including a first location where fluid flow is unrestricted, and a second location where fluid flow is restricted. Thus sensors 82,84,86 and 88 may be provided to obtain the optimum flow rate calculations.

Figure 4:
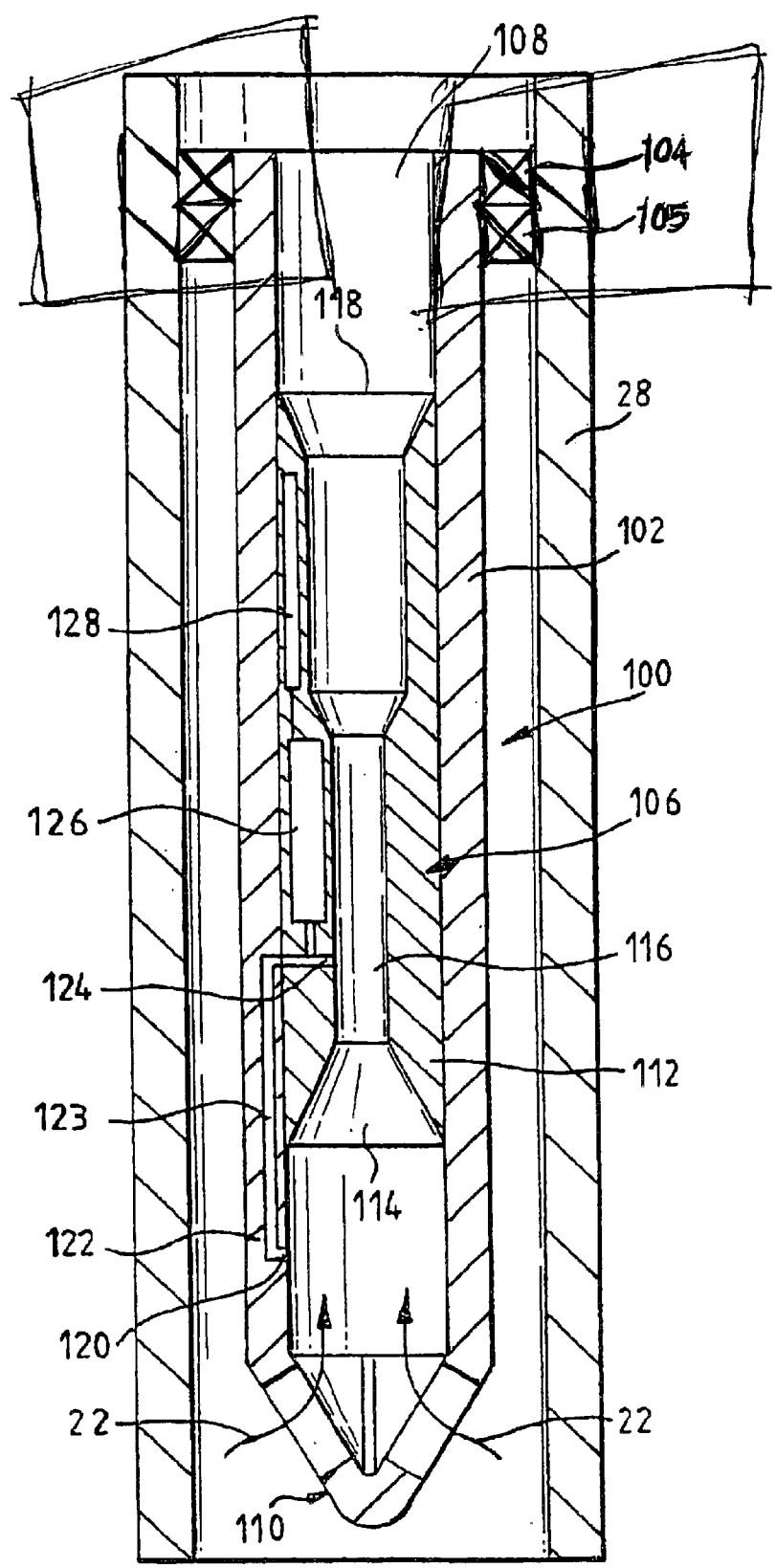
FIG. 4 is a longitudinal sectional view of a flowmeter in accordance with an alternative embodiment of the present invention.

Referring now to FIG. 4, there is shown an alternative embodiment of a flowmeter in accordance with the present invention, indicated generally by reference 100, which comprises a housing conduit 102, a locking mechanism 104, a seal mechanism 105, and a flow restrictor 106.

The housing conduit is a cylindrical sleeve 102 similar to the conduit 28 of FIGS. 1 to 3, having an open upper end 108 and a conical perforated lower end 110. The sleeve 102 is located in well tubing 28 by the locking mechanism 104 and sealed to the well tubing by seal mechanism 105.

The flow restrictor 106 is provided by a tubular insert 112 which is located within the sleeve 102. The tubular insert 112 has an upstream opening 114, which tapers from its leading end where the fluid flow is unrestricted, towards a throat 116 of constant reduced diameter disposed centrally within the sleeve 102, where fluid flow is restricted, then opens to downstream opening 118.

A first pressure sensor 120 is disposed within a wall 122 of sleeve 102 to measure the pressure of the fluid where flow is unrestricted, the wall 122 being thick enough to be machined to create wall conduits 123. A second pressure sensor 124 is disposed within the insert 112, to measure the pressure of the fluid in throat 116. Pressure sensors 120,124 are linked such that a differential pressure measurement of the pressure difference between the sensors is obtained, thus enabling the fluid flow rate to be calculated as described above.

Various modifications may be made to the flowmeter of the first embodiment. For example, absolute pressure sensors can be used to sense pressure and the pressure difference then calculated. Also, power may be provided by a wireline connection to the surface. An alternative second sleeve portion of different diameter may be connected to the first sleeve portion to vary the annulus spacing within the sleeve. Similarly, the entire insert can be unscrewed from the sleeve and inserted into a sleeve of different diameter. A range of sleeves of different diameters and a range of inserts of different diameters are provided; the sleeves and inserts being advantageously interchangeable to create a flowmeter for use with different sizes of well tubing with a range of flowmeters. The insert may also contain temperature measurement sensors. The annulus spacing may be varied by locating a cylindrical sheath within the sleeve of the flowmeter to space the annulus to a predetermined value.

Various modifications may be made to the second embodiment without departing from the scope of the invention. For example, the second pressure sensor 124 may be disposed at any point along the throat 116 where fluid flow is restricted. Pressure sensors 120 and 124 may measure the absolute fluid pressures, the pressure difference being subsequently calculated. If desired, additional pressure sensors may be provided within the sleeve 102 and spaced along its length, to measure the pressure of the fluid flowing through the sleeve 102 at various points.

The sleeve 102 includes an electronics housing 126 for storing data obtained, and a battery housing 128 for providing power for operation of the flowmeter 100 as required. In the same way as in the embodiment of FIGS. 1–3, the electronics and battery may be provided at the surface or externally from the flowmeter. The flow restrictor of flowmeter 100 is provided integrally with the sleeve 102. In this modification, sensors 120,124, the electronics housing 126 and battery housing 128 are provided within the wall 130 of the housing sleeve 102.

It will be appreciated by persons skilled in the art that sensors may be provided for measuring other parameters of the fluid flowing through the flowmeter such as temperature, fluid viscosity and the like.

The main advantage of providing a flowmeter 20 as a two-part component including a conduit 28 and a flow restriction insert 32 as shown in FIGS. 1 to 3 is that the relative spacing between the inner surface 58 of the conduit 28, and the outer surface of the sensor housing portion 42 is carefully controlled by precise machining of the component parts, and careful location of the flow restriction insert 32 within the housing conduit 28, prior to insertion of the flowmeter 20 into the well tubing 26. This permits more accurate flow rate measurements to be made than has hitherto been possible.

Other advantages are provided by flowmeter retrievability and insert/sleeve interchangeability which allows the flowmeter to be used with differently sized well tubing bore and over a range of flow rates.

What is claimed is:

1. A flowmeter for measuring the flow rate of a fluid flowing through a conduit having an inside diameter, the flowmeter comprising:

a housing conduit for location within a portion of the conduit, the housing conduit having a generally cylindrical inner surface and an outer surface, said housing conduit having an outside diameter less than an inside diameter of the portion of the conduit;

locating means for locating the housing conduit within the conduit to provide sealing engagement between the housing conduit and the conduit;

flow restriction means disposed within the housing conduit to create a flow restriction zone at a portion of the housing conduit to provide a restriction to fluid flow through said housing conduit, said flow restriction means comprising a generally cylindrical insert having a leading end on which fluid flowing through the housing conduit impinges, said leading end being coupled to a body of substantially constant diameter, the diameter of the leading end being less than the diameter of the body of the insert such that an annular flow path is created around said insert, and pressure measurement means disposed in the housing conduit for measuring pressure of the fluid at least at two spaced pressure measurement locations along the length of the housing conduit to measure a pressure at a first unrestricted flow location and at a second location within the flow restriction zone, said housing conduit having predetermined internal diameters at the first and second pressure measuring locations, wherein said second pressure measurement location is in said cylindrical insert body at said substantially constant diameter to measure pressure within said flow restriction zone.

2. A flowmeter as claimed in claim 1 wherein the locating means includes locking means and sealing means for locking and sealing the housing conduit to the flow conduit, such that when the flowmeter is located in the flow conduit, fluid flows only through the housing conduit.

3. A flowmeter as claimed in claim 2 wherein the locking means and the sealing means are integral, such that the housing conduit is simultaneously engaged by the locking means and sealed to the conduit by the sealing means.

4. A flowmeter as claimed in claim 2 wherein the locking means and the sealing means are separate, such that the housing conduit is separately engaged by the locking means and sealed to the conduit by the sealing means.

5. A flowmeter as claimed in claim 1 further comprising flow restriction centralising means for centralising the flow restriction means within the housing conduit.

6. A flowmeter as claimed in claim 1 wherein the pressure measurement means are differential pressure sensors.

7. A flowmeter as claimed in claim 1 wherein the pressure measurement means are absolute pressure sensors.

8. A flowmeter as claimed in claim 1 wherein one of the pressure measurement locations is at the leading edge of the flow restriction means for measuring the pressure at the unrestricted flow location, and the other pressure measurement location is at a point along the length of the body of substantially constant diameter of the flow restriction means, for measuring the pressure at the restricted flow location.

9. A method of measuring the flow rate of a fluid flowing through a flow conduit, comprising the steps of:

locating a housing conduit having a generally cylindrical internal bore within the flow conduit;

sealing the housing conduit in the flow conduit to force fluid flowing through the flow conduit to flow through the internal bore of the housing conduit;

providing a restriction comprising a generally cylindrical insert having a leading end coupled to a body of substantially constant diameter, wherein the diameter of the leading end is less than the diameter of the body of the insert;

locating the restriction in the internal bore of the conduit for restricting the flow of fluid through the internal bore, such that fluid flowing therethrough impinges on the leading end and flows in an annular flow path created around the insert;

measuring the pressure of the fluid at least at a first unrestricted flow location and at a second restricted flow location in said cylindrical insert body at said substantially constant diameter, and determining the fluid flow rate using measurements of fluid pressure taken at the first and second locations.

10. A flowmeter for measuring a range of flow rates in flow conduits having different diameters, said flowmeter comprising:

a) a generally cylindrical housing conduit selected from a range of generally cylindrical housing conduits of different diameters;

b) sealing means coupled to said selected housing conduit for sealingly engaging an internal surface of said flow conduit;

c) a flow restrictor element releasably engageable with said housing conduit, said flow restrictor element being selected from a range of flow restrictor elements of different diameters, said flow restrictor element comprising a generally cylindrical insert having a leading end on which fluid flowing through the selected housing conduit impinges, said leading end being coupled to a body of substantially constant diameter, a diameter of the leading end being less than a diameter of the body of the insert such that an annular flow path is created around said insert, each flow restrictor element further having at least two spaced pressure measurement means for measuring pressure at an unrestricted flow location and a restricted flow location, one of said pressure measurement locations being in said cylindrical insert body at said substantially constant diameter to measure pressure at said flow restriction location; and wherein said housing conduit and said flow restrictor element are interchangeable with other housing conduits and flow restrictor elements from the respective ranges to allow the flowmeter to be assembled for use with a range of flow rates and flow conduit diameters.

11. A flowmeter as claimed in claim 10 wherein the flow restrictor element is centrally disposed in the housing conduit for creating the annular flowpath.

* * * * *